US010625789B2

United States Patent
Kim et al.

(10) Patent No.: US 10,625,789 B2
(45) Date of Patent: Apr. 21, 2020

(54) ROOF FRAME STRUCTURE FOR BUS (71) Applicants: Hyundai Motor Company, Seoul (KR); Kia Motors Corporation, Seoul (KR); Industry-University Cooperation Foundation Hanyang University, Seoul (KR)

(72) Inventors: Jongmin Kim, Gyeonggi-Do (KR); Seungjae Min, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 94 days.

(21) Appl. No.: 15/969,013

(22) Filed: May 2, 2018

(65) Prior Publication Data
US 2019/0168814 A1 Jun. 6, 2019

(30) Foreign Application Priority Data
Dec. 4, 2017 (KR) ........................ 10-2017-0164940

(51) Int. Cl.
B62D 25/06 (2006.01)
B62D 31/02 (2006.01)
B62D 29/00 (2006.01)

(52) U.S. Cl.
CPC ........... B62D 25/06 (2013.01); B62D 29/008 (2013.01); B62D 31/02 (2013.01)

(58) Field of Classification Search
CPC ....... B62D 25/06; B62D 31/02; B62D 29/008
USPC ............................. 296/29, 30, 178, 205, 210
See application file for complete search history.

(56) References Cited

U.S. PATENT DOCUMENTS

| 4,358,914 A * | 11/1982 | Geyer | B62D 31/02 |
| | | | 296/178 |
| 8,056,958 B2 * | 11/2011 | Oriet | B60R 21/13 |
| | | | 296/178 |
| 9,126,602 B2 * | 9/2015 | Bigras | B61D 17/12 |
| 2008/0116714 A1 * | 5/2008 | Timmermans | B62D 25/06 |
| | | | 296/178 |

FOREIGN PATENT DOCUMENTS

EP 244371 A2 * 4/1987

* cited by examiner

*Primary Examiner* — Jason S Morrow
*Assistant Examiner* — E Turner Hicks
(74) *Attorney, Agent, or Firm* — Mintz Levin Cohn Ferris Glovsky and Popeo, P.C.; Peter F. Corless (57) ABSTRACT

A roof frame structure for a bus is provided. The structure includes a plurality of bow members that are spaced apart from each other in a longitudinal direction of the bus and a plurality of support members that are disposed between the plurality of bow members. Each bow member is extended in a lateral direction of the bus and at least some support members among the plurality of support members are inclined at a predetermined angle with respect to a longitudinal axis of the bus.

10 Claims, 6 Drawing Sheets

ROOF FRAME STRUCTURE FOR BUS

CROSS-REFERENCE TO RELATED APPLICATION

This application is based on and claims the benefit of priority to Korean Patent Application No. 10-2017-0164940, filed on Dec. 4, 2017, the disclosure of which is incorporated herein in its entirety by reference.

TECHNICAL FIELD

The present disclosure relates to a roof frame structure for a bus and, more particularly, to a roof frame structure for a bus, which significantly reduces an overall weight and improves stiffness of the structure.

BACKGROUND

Generally, a bus is a type of vehicle that is designed to carry and move a large number of passengers compared to a more compact vehicle. A typical bus includes a front end with the windshield for providing a view of the road ahead, two sidewalls, and a rear end in which the engine is accommodated, a floor, and a roof. The roof includes an outer roof surface and a roof frame structure. The roof frame structure may have a plurality of roof bow members and a plurality of roof stringers, and the outer roof surface may cover the roof frame structure. Recently, low-floor buses have been introduced. Compared to conventional buses, the low-floor bus has a flat and lower floor, eliminating steps at an entrance(s) of the bus, thereby improving accessibility for users such as the elderly, people with disabilities, and pregnant women.

However, as the floor of the low-floor bus is lowered, a fuel tank such as CNG bombe may be disposed on the roof of the bus. Thus, the low-floor bus has a high center of gravity, and the risk of rollover may increase. With the addition of stiffeners or reinforcing materials to reinforce the roof frame structure, the weight of the low-floor bus may increase by approximately two tons, compared to that of a typical bus. For example, the fuel economy of the low-floor bus may be approximately 1.7 km/m$^3$, which is reduced by roughly 23%, compared to approximately 2.2 km/m$^3$, the fuel economy of the typical bus. In addition, as the low-floor bus includes a substantial amount of stiffeners or reinforcing materials added to the roof frame structure, the manufacturing and assembly thereof may be complex, and thus the manufacturing costs thereof may be increased. For example, the cost of the low-floor bus may be approximately 210 million won, which is greater than twice the cost (e.g., approximately 100 million won) of the typical bus.

SUMMARY

The present disclosure provides a roof frame structure for a bus, which is lightweight compared to a conventional structure and has improved structural stiffness to reduce the risk of rollover and improve fuel economy.

According to an aspect of the present disclosure, a roof frame structure for a bus may include: a plurality of bow members spaced apart from each other in a longitudinal direction of the bus; and a plurality of support members disposed between the plurality of bow members. Each bow member may be extended in a lateral direction of the bus, and at least some support members among the plurality of support members may be inclined at a predetermined angle with respect to a longitudinal axis of the bus.

The bow members and the support members may be made of materials having different rigidities, and the support members may be made of a material having a greater rigidity than that of the bow members. The roof frame structure may further include a pair of cant rails that extend in the longitudinal direction of the bus. The roof frame structure may further include a pair of reinforcing rails that connect the plurality of bow members in the longitudinal direction of the bus. The reinforcing rails may be parallel to the cant rails, respectively.

The plurality of support members may include: a plurality of first support members inclined to connect between two adjacent bow members; a plurality of second support members that intersect between two adjacent bow members and connect between two adjacent bow members; and a plurality of third support members inclined to connect a bow member and a portion of the cant rail adjacent to the bow member. The plurality of first support members may have different directions of inclination. The plurality of first support members may have different angles of inclination depending on loads of components to be supported.

The roof frame structure may further include a plurality of fourth support members that connect a portion of the cant rail and two bow members adjacent thereto. Additionally, the roof frame structure may include: at least one fifth support member that extends in the lateral direction of the bus; and a plurality of sixth support members connected to intersect with the fifth support member. The fifth support member may have a pair of bent ends attached to both ends thereof, and the fifth support member may be connected to the pair of cant rails via the pair of bent ends. The bent ends of the fifth support member may be made of a material having a rigidity lower than that of the fifth support member.

The roof frame structure may further include a plurality of support sections in which the plurality of bow members and the plurality of support members are arranged differently based on weight of components to be supported, and the plurality of support sections may be arranged in a line in the longitudinal direction of the roof frame structure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are merely used to distinguish one element from another element, and the intrinsic features, sequence or order, and the like of the corresponding elements are not limited by the terms. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
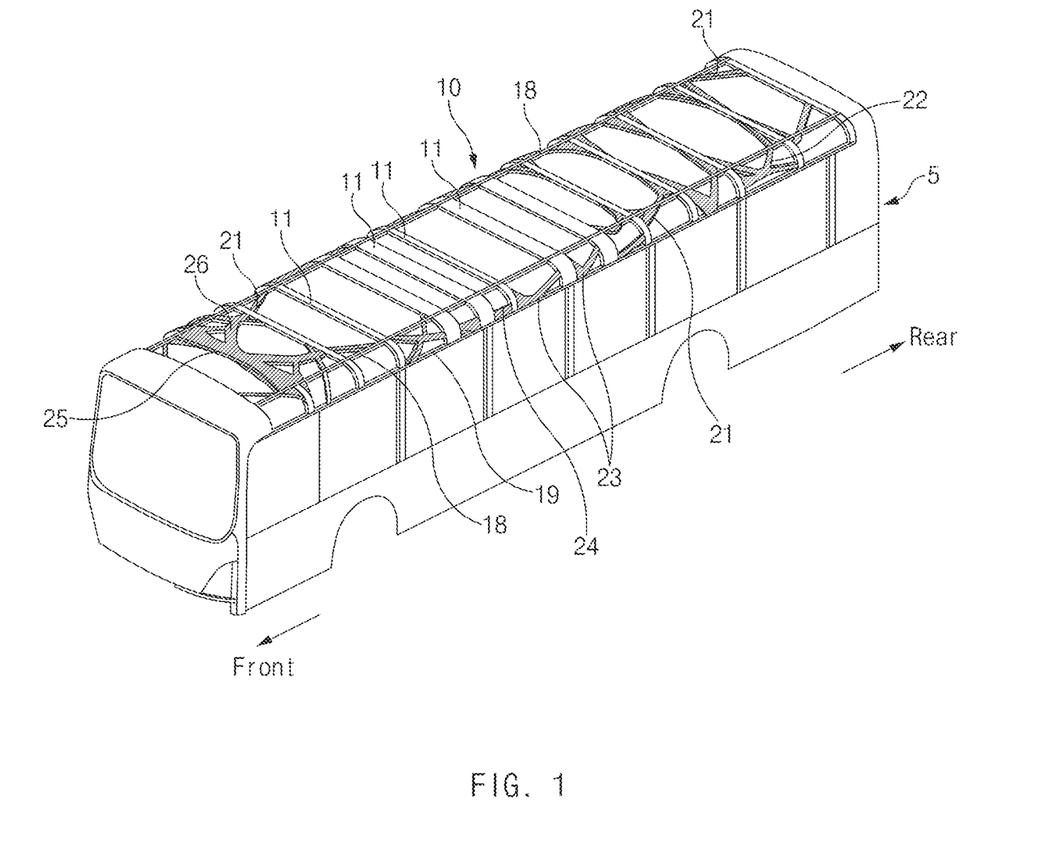
FIG. 1 illustrates a perspective view of a roof frame structure for a bus coupled to a bus body, according to an exemplary embodiment of the present disclosure.

Referring to FIG. 1, a roof frame structure 10 for a bus, according to an exemplary embodiment of the present disclosure, may be disposed on top of a bus body 5. The roof frame structure 10 for a bus may include a plurality of bow members 11 and a plurality of support members 21, 22, 23, 24, 25, and 26. An outer roof surface (not shown) may be disposed on a top of the roof frame structure 10 for a bus. Each bow member 11 may be extended in a lateral direction of the bus, and the plurality of bow members 11 may be spaced apart from each other in a longitudinal direction of the bus. Each bow member 11 may be made of a metal material, such as aluminum, which is lightweight and relatively inexpensive. Thus, the weight and cost of the roof frame structure 10 may significantly be reduced.

A gap or space between the bow members 11 may differ based on support sections 31, 32, and 33 to be described later. For example, a support section in which a vertical load is maximally applied to the bow members 11 includes a substantial number of the bow members 11 as the gap between the bow members 11 is narrowed or decreased, and a support section in which the vertical load is minimally applied to the bow members 11 includes a minimal number of the bow members 11 as the gap between the bow members 11 is increased or widened. Each bow member 11 may have a shape that corresponds to that of the outer roof surface in the lateral direction. Additionally, each bow member 11 may have a transverse portion 11a in a central portion thereof, and a pair of bent ends 11b at both ends thereof. The transverse portion 11a may be extended linearly in the lateral direction of the bus body 5. Each bent end 11b may be bent toward the bus body 5. Due to these bent ends 11b, the rigidity of each bow member 11 may be increased.

The roof frame structure 10 may include a pair of cant rails 19 that extend in the longitudinal direction of the bus. The pair of cant rails 19 may be spaced apart from each other in the lateral direction of the bus to be arranged symmetrically on left and right edges of the roof frame structure 10. The bottoms of the bent ends 11b may be bonded to the cant rails 19 by welding, using fasteners, or the like, respectively. The cant rails 19 may be coupled to the bus body 5. Further, the roof frame structure 10 may include a pair of reinforcing rails 18 that extend in the longitudinal direction of the bus. The pair of reinforcing rails 18 may be disposed parallel to the pair of cant rails 19 to connect the pair of reinforcing rails 18 to the plurality of bow members 11 in the longitudinal direction of the bus. The left reinforcing rail 18 may be spaced apart from the left cant rail 19 by a predetermined gap, and the right reinforcing rail 18 may be spaced apart from the right cant rail 19 by a predetermined gap.

According to an exemplary embodiment, the reinforcing rails 18 may connect respective ends of the transverse portions 11a of the bow members 11 in the longitudinal direction of the bus. Since the plurality of bow members 11 are connected by the pair of reinforcing rails 18 in the longitudinal direction of the bus, the longitudinal stiffness of the roof frame structure 10 may be reinforced.

Additionally, the plurality of support members 21, 22, 23, 24, 25, and 26 may be disposed between the plurality of bow members 11, and at least some support members among the plurality of support members 21, 22, 23, 24, 25, and 26 may be inclined at predetermined angles with respect to a longitudinal axis X1 of the bus. Each of the support members 21, 22, 23, 24, 25, and 26 may be made of a rigid material, such as steel, having a greater rigidity than the material of the bow members 11. Thus, the plurality of support members 21, 22, 23, 24, 25, and 26 may more stably support loads of a fuel tank 1, such as CNG bombe, an air conditioning device 2, and the like, which are mounted on the roof of the bus.

Since the bow members 11 and the support members 21, 22, 23, 24, 25, and 26 may be made of materials having different rigidities, structural stiffness may be increased, and the weight and manufacturing costs may significantly be reduced. The plurality of support members 21, 22, and 23 may include a plurality of first support members 21 inclined to connect between two adjacent bow members 11, a plurality of second support members 22 that intersect each other between two adjacent bow members 11, and a plurality of third support members 23 inclined to connect the bow member(s) 11 and a portion of the cant rail 19 adjacent thereto. Each first support member 21 may be inclined at a predetermined angle with respect to the longitudinal axis X1 of the bus between two adjacent bow members 11, thereby connecting the two adjacent bow members 11 in a direction of inclination. Thus, structural stiffness between the adjacent bow members 11 may be achieved.

Figure 2:
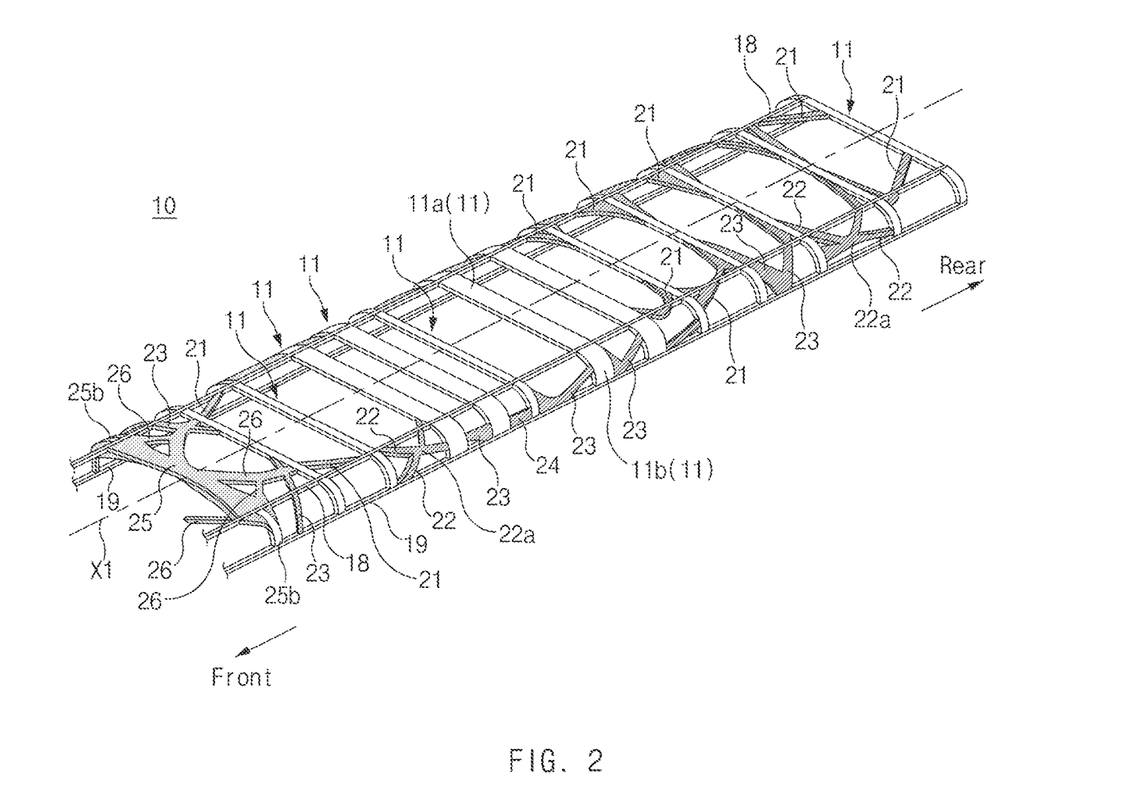
FIG. 2 illustrates a perspective view of a roof frame structure for a bus, according to an exemplary embodiment of the present disclosure.

Moreover, each reinforcing rail 18 may pass through the first support members 21. According to an exemplary embodiment, at least one pair of first support members 21 may be disposed symmetrically between two adjacent bow members 11. Additionally, the plurality of first support members 21 may have different directions of inclination based on positions thereof in the roof frame structure 10. As illustrated in FIG. 2, the pair of first support members 21 positioned on the front side of the roof frame structure 10 may have a direction of inclination that decreases a gap between front ends of the first support members 21, and the pair of first support members 21 positioned on the rear side of the roof frame structure 10 may have a direction of inclination that decreases a gap between rear ends of the first support members 21.

In addition, the plurality of first support members 21 may have different angles of inclination or the same angle of inclination based on loads of components to be supported thereby. For example, the first support members 21 may be inclined to connect between the transverse portion 11a of a first bow member 11 and the bent ends 11b of a second bow member 11 adjacent thereto. The reinforcing rail 18 may pass through the first support members 21. As another example, the first support members 21 may be inclined to connect between the bent ends 11b of a first bow member 11 and the bent ends 11b of a second bow member 11 adjacent thereto. The reinforcing rail 18 may pass through the first support members 21. In another example, the first support members 21 may be inclined to connect between the transverse portion 11a of a first bow member 11 and the transverse portion 11a of a second bow member 11 adjacent thereto.

Two or more second support members 22 may intersect between two adjacent bow members 11, and each second support member 22 may be inclined at a predetermined angle with respect to the longitudinal axis X1 of the bus. The second support members 22 may connect between two adjacent bow members 11 to reinforce structural stiffness between the adjacent bow members 11. The structure, shape, and the like of the second support members 22 may be the same as or similar to those of the first support members 21.

Each third support member 23 may be inclined at a predetermined angle with respect to the longitudinal axis X1 of the bus to connect the bow member(s) 11 and a portion of the cant rail 19 adjacent thereto. For example, the third support member 23 may be inclined to connect between the bent end 11b of a first bow member 11 and a portion of the cant rail 19 adjacent thereto. As another example, the third support member 23 may be inclined to connect the bent end 11b of a first bow member 11, a portion of the cant rail 19 adjacent thereto, and the bent end 11b of a second bow member 11. In another example, the third support member 23 may be inclined to connect the transverse portion 11a of a first bow member 11 and a portion of the cant rail 19 adjacent thereto. As another example, the third support member 23 may be inclined to connect the transverse portion 11a of a first bow member 11, a portion of the cant rail 19 adjacent thereto, and the bent end 11b of a second bow member 11.

In addition, the roof frame structure 10, according to an exemplary embodiment of the present disclosure, may further include a plurality of fourth support members 24. Each fourth support member 24 may be attached to a portion of the cant rail 19, and ends of the fourth support member 24 may be attached to the bent ends 11b of the bow members 11 adjacent thereto, respectively, to connect the fourth support member 24 with the two adjacent bow members 11 and the cant rail 19. By connecting the portion of the cant rail 19 and the two adjacent bow members 11, the fourth support member 24 may increase edge stiffness of the roof frame structure 10. The fourth support member 24 may be inclined at a predetermined angle with respect to the longitudinal axis X1 of the bus, or may be parallel to the longitudinal axis X1 of the bus.

Further, the roof frame structure 10, according to an exemplary embodiment of the present disclosure, may include at least one fifth support member 25. The fifth support member 25 may be extended in the lateral direction of the bus. For example, the fifth support member 25 may be extended in a direction orthogonal to the longitudinal axis X1 of the bus. A pair of bent ends 25b may be coupled to both ends of the fifth support member 25, and the bent ends 25b may be attached to the cant rail 19, respectively. The fifth support member 25 may be connected to the cant rail 19 via the pair of bent ends 25b. In addition, the fifth support member 25 may be made of a rigid material, such as steel or a composite material, having a greater rigidity than the material of the bow member 11. Accordingly, the fifth support member 25 may operate as a reinforcing member that increases support stiffness of the roof frame structure 10. The pair of bent ends 25b may be made of a metal material, such as aluminum, the same as that of the bow member 11.

Figure 3:
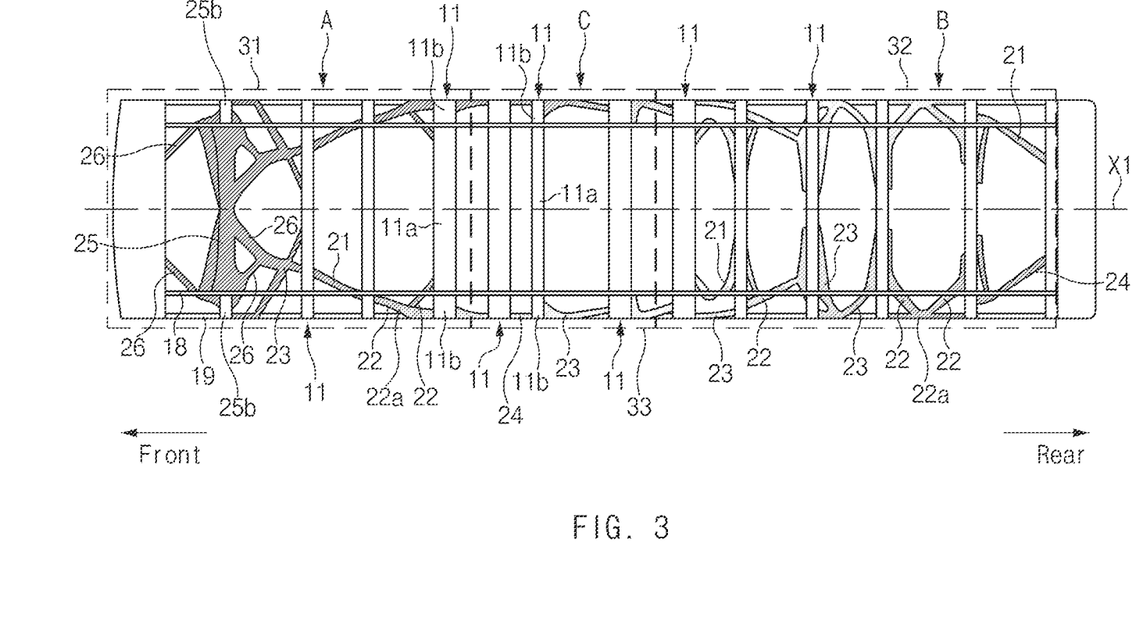
FIG. 3 illustrates a plan view of a roof frame structure for a bus, according to an exemplary embodiment of the present disclosure.
Figure 4:
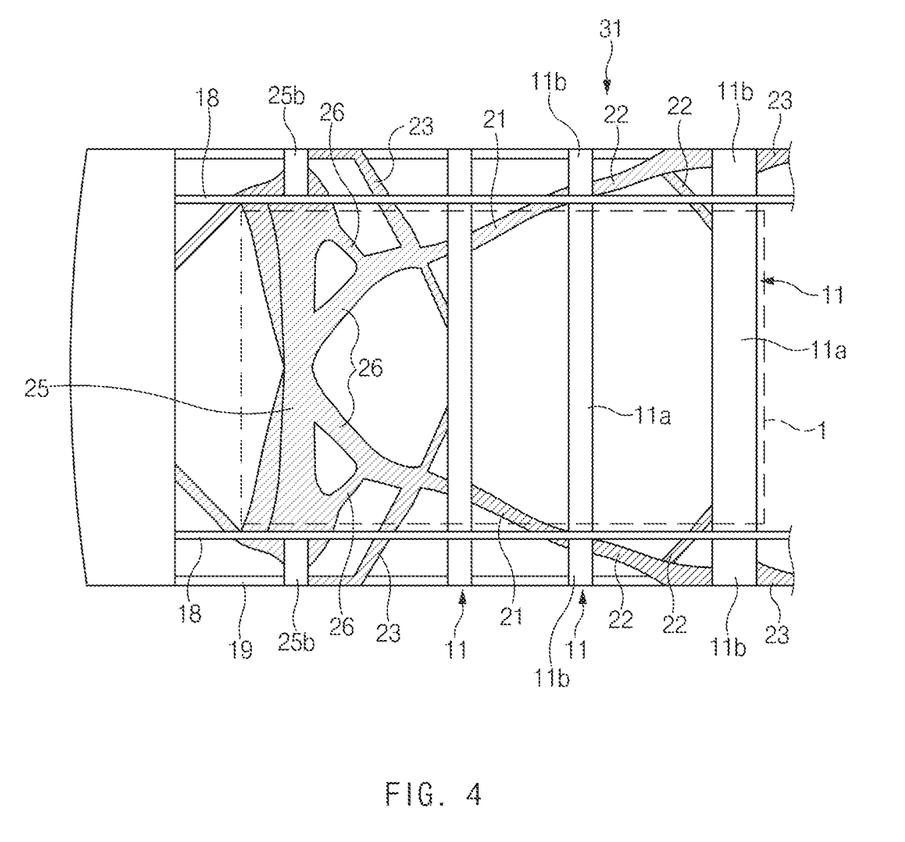
FIG. 4 illustrates a detailed view of portion A in FIG. 3 according to an exemplary embodiment of the present disclosure.

The fifth support member 25 may be disposed in a support section (e.g., a first support section 31 of the roof frame structure 10 in FIGS. 3 and 4) that supports a heavy component such as CNG bombe, thereby increasing the support stiffness of the roof frame structure 10. A plurality of sixth support members 26 may be connected to intersect with the fifth support member 25, and each sixth support member 26 may be inclined at a predetermined angle with respect to the longitudinal axis X1 of the bus. The support stiffness by the fifth support member 25 may further be increased by the sixth support members 26. In addition, the plurality of sixth support members 26 may be disposed to intersect with each other.

Moreover, the first support members 21, the second support members 22, the third support members 23, the fourth support members 24, the fifth support member 25, and the sixth support members 26 may be inclined with respect to the longitudinal axis X1 of the bus as illustrated in the drawings, but the structure is not limited thereto. According to an exemplary embodiment, a support member (not shown) parallel to the longitudinal axis X1 of the bus may further be included. As illustrated in FIG. 3, the roof frame structure 10 may include the plurality of support sections 31, 32, and 33 in which the plurality of bow members 11 and the plurality of support members 21, 22, 23, 24, 25, and 26 may be arranged differently based on weight of components to be supported. The plurality of support sections 31, 32, and 33 may be arranged in a line in the longitudinal direction of the roof frame structure 10.

Each of the support sections 31, 32, and 33 may be varied based on a type, weight, size, shape, arrangement, and the like of components to be mounted on a bus. For example, when the fuel tank 1, such as CNG bombe, is mounted on the front side of the roof frame structure 10, and the air conditioning device 2 is mounted on the rear side of the roof frame structure 10, the roof frame structure 10 may be divided into the first support section 31 that supports a relatively heavy component such as the fuel tank 1, a second support section 32 that supports a lighter component such as the air conditioning device 2, and a third support section 33 in which no component is mounted.

As illustrated in FIG. 4, the first support section 31 may support a relatively heavy component such as the fuel tank 1 (e.g., about one ton). In consideration of the structural characteristics of the bus, the first support section 31 may be disposed on the front side of the roof frame structure 10. The first support section 31 may include the plurality of bow members 11, and the plurality of first support members 21, the plurality of second support members 22, and the plurality of third support members 23, selectively disposed between the plurality of bow members 11.

In particular, the first support section 31 may further include the fifth support member 25 to support the fuel tank 1 which is relatively large and heavy (e.g., may support a first component, such as a fuel tank, which is heavier in weight than a second component, such as, an air conditioner), and the fifth support member 25 may be adjacent to the front end of the roof frame structure 10. The plurality of sixth support members 26 may be connected to intersect with the fifth support member 25. In particular, the first support section 31 may stably support the relatively heavy component such that the support stiffness may be improved by the fifth support member 25 and the plurality of sixth support members 26.

Figure 5:
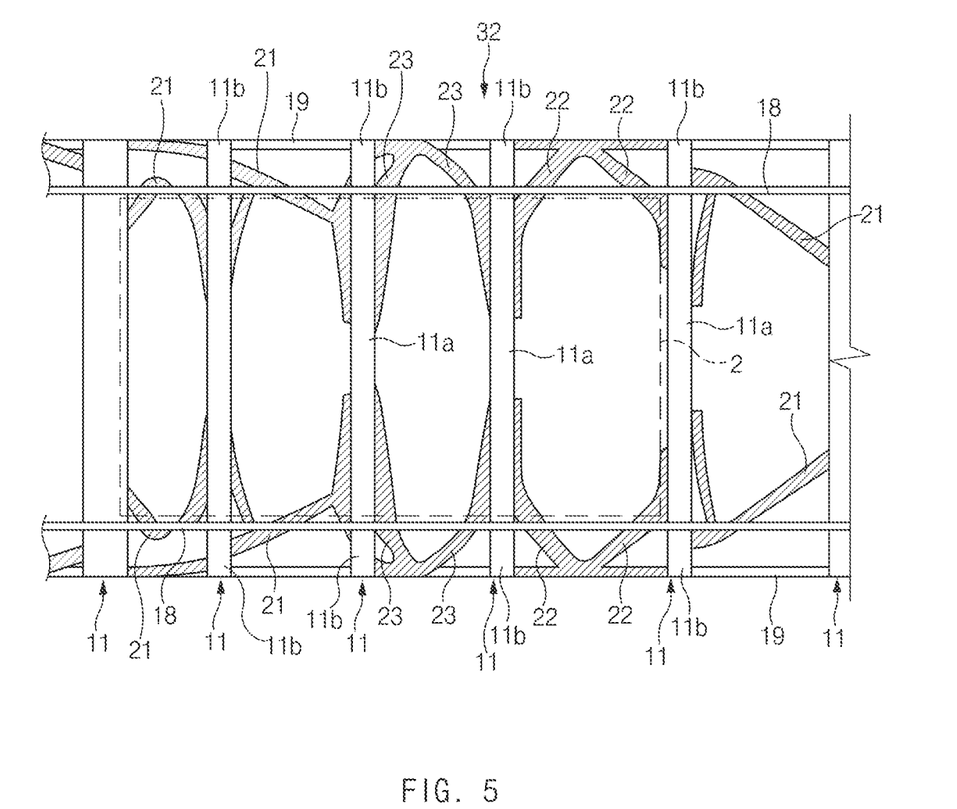
FIG. 5 illustrates a detailed view of portion B in FIG. 3 according to an exemplary embodiment of the present disclosure.

As illustrated in FIG. 5, the second support section 32 may support a relatively light component, such as the air conditioning device 2 (e.g., about 270 kg), compared to the component mounted in the first support section 31. In consideration of the structural characteristics of the bus, the second support section 32 may be disposed on the rear side of the roof frame structure 10. The second support section 32 may include the plurality of bow members 11, and the plurality of first support members 21, the plurality of second support members 22, and the plurality of third support members 23, selectively disposed between the plurality of bow members 11.

Meanwhile, since the second support section 32 supports a relatively light component such as the air conditioning device 2, compared to the first support section 31, the fifth support member 25 and the sixth support members 26 may be eliminated from the second support section 32. However, the number of bow members 11 required in the second support section 32 may be greater than the number of bow members 11 required in the first support section 31. For example, the first support section 31 may include three bow members 11, while the second support section 32 may include six bow members 11. However, the present disclosure is not limited thereto.

Figure 6:
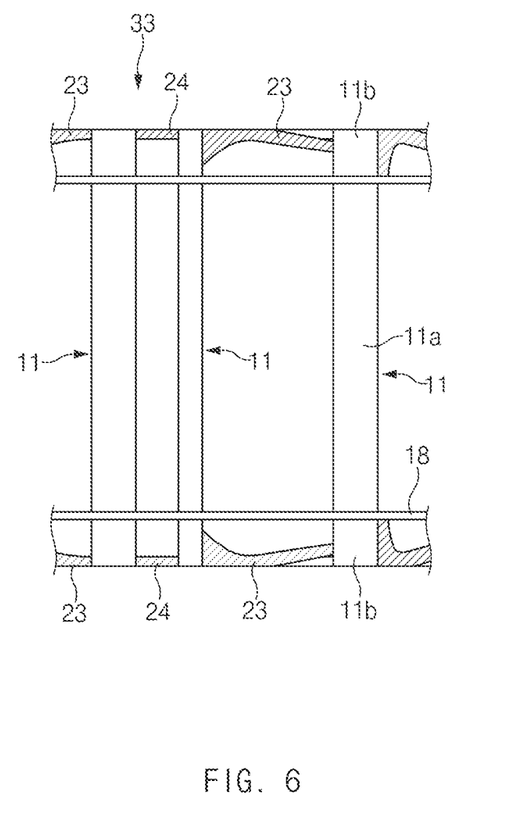
FIG. 6 illustrates a detailed view of portion C in FIG. 3 according to an exemplary embodiment of the present disclosure.

As illustrated in FIG. 6, since any component such as the fuel tank 1 or the air conditioning device 2 is not mounted in the third support section 33 (e.g., the third support section 33 is vacant), a support structure with respect to a vertical load may be omitted. Since the third support section 33 obtains the support stiffness with only the plurality of bow members 11, the third support section 33 may include the plurality of bow members 11, and the third support section 33 may eliminate the first support members 21, the second support members 22, the fifth support member 25, and the sixth support members 26. However, the third support section 33 may selectively include the plurality of third support members 23 and the plurality of fourth support members 24 to supplement torsional rigidity, longitudinal stiffness, lateral stiffness, and the like.

According to an exemplary embodiment, after the plurality of bow members 11 and the plurality of support members 21, 22, 23, 24, 25, and 26 are individually formed by casting or molding, the plurality of bow members 11, the plurality of support members 21, 22, 23, 24, 25, and 26, the cant rails 19, and the reinforcing rails 18 may be connected to each other by welding, using fasteners, or the like, to manufacture the roof frame structure 10.

According to another exemplary embodiment, the plurality of support members 21, 22, 23, 24, 25, and 26 and the plurality of bow members 11 may be formed by insert molding such that the roof frame structure 10 may be manufactured to have a structure in which the plurality of support members 21, 22, 23, 24, 25, and 26 are integrally formed with the plurality of bow members 11. In addition, after these members are formed as a plurality of modules by insert molding in accordance with the support sections 31, 32, and 33, the plurality of modules may be assembled with the cant rails 19 and the reinforcing rails 18 to manufacture the roof frame structure 10.

Table 1 below shows test results of deformation according to an exemplary embodiment of the present disclosure and according to the related art.

TABLE 1

| Performance | | Related Art | Embodiment of Present Disclosure |
|---|---|---|---|
| Deformation (mm) | Application of Load in Lateral Direction | 12 | 11.4 |
| | Rollover Test | 32 | 31.6 |
| | Application of Torsion in Left Direction | 12 | 11.7 |
| | Application of Torsion in Right Direction | 22 | 21.6 |

Table 1 shows the results of the following tests with respect to a conventional roof frame structure (lattice structure) according to the related art and an inventive roof frame structure according to an exemplary embodiment of the present disclosure, each of which is assembled to a bus body: a test in which a load is applied in a lateral direction, a rollover test, a test in which torsion is applied in a left direction, and a test in which torsion is applied in a right direction.

Particularly, in a test in which a load of 1 G (gravitational acceleration) is applied in a lateral direction, the conventional roof frame structure indicated a deformation of 12 mm, while the inventive roof frame structure indicated a deformation of 11.4 mm. As shown in the table, lateral stiffness in the exemplary embodiment of the present disclosure has been improved, compared to the related art.

In a rollover test, the conventional roof frame structure indicated a deformation of 32 mm, while the inventive roof frame structure indicated a deformation of 31.6 mm. As shown, resistance to rollover in the exemplary embodiment of the present disclosure has been improved, compared to the related art. Additionally, in a test in which torsion is applied in a left direction, the conventional roof frame structure indicated a deformation of 12 mm, while the inventive roof frame structure indicated a deformation of 11.7 mm. Thus, as shown, resistance to the torsion applied in the left direction in the exemplary embodiment of the present disclosure has been improved, compared to the related art. In a test in which torsion is applied in a right direction, the conventional roof frame structure indicated a deformation of 22 mm, while the inventive roof frame structure indicated a deformation of 21.6 mm. The table thus shows that resistance to the torsion applied in the right direction in the exemplary embodiment of the present disclosure has been improved, compared to the related art.

According to the exemplary embodiments of the present disclosure, the plurality of bow members 11 and the plurality of support members 21, 22, 23, 24, 25, and 26 may be made of different materials, thereby reducing weight and effectively improving structural stiffness, and the like. Thus, longitudinal stiffness, lateral stiffness, torsional rigidity, and the like may significantly be improved.

As set forth above, according to exemplary embodiments of the present disclosure, since at least some support members are disposed to be inclined between the plurality of bow members, the roof frame structure for a bus may be lightweight and have improved structural stiffness to thereby lower the risk of rollover and improve fuel economy. In addition, as the bow members and the support members are made of different materials, the structural stiffness may be improved, and the weight and manufacturing costs may significantly be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A roof frame structure for a bus, comprising:
    a plurality of bow members spaced apart from each other in a longitudinal direction of the bus;
    a plurality of support members disposed between the plurality of bow members; and
    a pair of cant rails that extend in the longitudinal direction of the bus,
    wherein each bow member extends in a lateral direction of the bus, and
    wherein the plurality of support members includes:
        a plurality of first support members inclined to connect between a first set of adjacent bow members of the plurality of bow members;
        a plurality of second support members that intersect between a second set of adjacent bow members of the plurality of bow members and connect between the second set of adjacent bow members;
        a plurality of third support members inclined to connect a bow member of the plurality of bow members and a portion of a cant rail of the plurality of cant rails, the portion of the cant rail being adjacent to the bow member; and
        at least one fifth support member that extends in the lateral direction of the bus,
        wherein the fifth support member includes a pair of bent ends attached to both ends thereof, and the fifth support member is connected to the pair of cant rails via the pair of bent ends.

2. The roof frame structure according to claim 1, wherein the bow members and the support members are made of materials having different rigidities, and the support members are made of a material having a greater rigidity than that of the bow members.

3. The roof frame structure according to claim 1, further comprising a pair of reinforcing rails that connect the plurality of bow members in the longitudinal direction of the bus.

4. The roof frame structure according to claim 3, wherein the reinforcing rails are parallel to the cant rails, respectively.

5. The roof frame structure according to claim 1, wherein the plurality of first support members have different directions of inclination.

6. The roof frame structure according to claim 1, wherein the plurality of first support members have different angles of inclination depending on loads of components to be supported.

7. The roof frame structure according to claim 1, further comprising a plurality of fourth support members that connect another portion of the cant rail of the plurality of cant rails and two bow members of the plurality of bow members adjacent thereto.

8. The roof frame structure according to claim 1, further comprising:
    a plurality of sixth support members connected to intersect with the fifth support member.

9. The roof frame structure according to claim 1, wherein the bent ends of the fifth support member are made of a material having a rigidity lower than that of the fifth support member.

10. The roof frame structure according to claim 1, further comprising a plurality of support sections in which the plurality of bow members and the plurality of support members are arranged differently depending on weight of components to be supported.

* * * * *